United States Patent [19]

Joy

[11] Patent Number: 5,010,728
[45] Date of Patent: Apr. 30, 1991

[54] SOLID FUEL TURBINE ENGINE

[75] Inventor: John R. Joy, Brighton, Mich.

[73] Assignee: Williams International Corporation, Walled Lake, Mich.

[21] Appl. No.: 789,315

[22] Filed: Oct. 18, 1985

[51] Int. Cl.$^5$ ............................................. F02G 1/00
[52] U.S. Cl. .................................. 60/39.464; 60/253
[58] Field of Search ............... 60/39.464, 246, 253, 60/256

[56] References Cited

U.S. PATENT DOCUMENTS

| | | | |
|---|---|---|---|
| 2,968,146 | 1/1961 | Howell et al. | 60/246 |
| 2,988,877 | 6/1961 | Shope | 60/256 |
| 3,161,378 | 12/1964 | Creasey et al. | 60/246 |
| 3,271,951 | 9/1966 | Nettel | 60/39.464 |
| 4,096,803 | 7/1978 | Kesting | 60/246 |
| 4,152,890 | 5/1979 | Weiland | 60/39.464 |
| 4,423,332 | 12/1983 | Fergler | 60/39.464 |

Primary Examiner—Louis J. Casaregola
Assistant Examiner—T. S. Thorpe
Attorney, Agent, or Firm—Lyon & Delevie

[57] ABSTRACT

A solid fuel turbine engine comprises a centrally disposed axially extending shaft having an annular combustion chamber disposed thereabout intermediate the ends thereof. A compressor is mounted at one end of the shaft for delivering air to the combustion chamber to provide the principal source of oxygen for combustion and a turbine is mounted at the other end of the shaft. The turbine is driven by combustion gases and drives the compressor. An annular solid fuel charge is disposed in the combustion chamber for producing combustion gases.

3 Claims, 1 Drawing Sheet

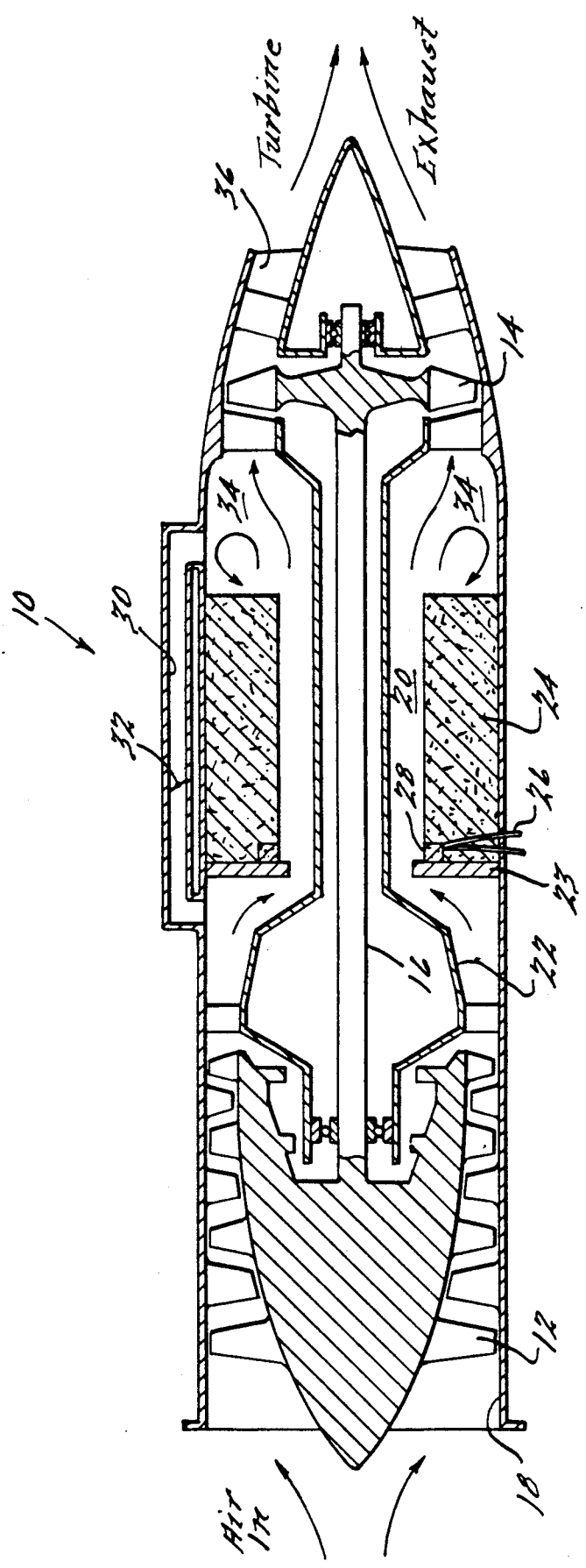

SOLID FUEL TURBINE ENGINE

BACKGROUND OF THE INVENTION

This invention relates to a propulsion system that utilizes solid fuel in combination with a turbofan, turbojet, or turboshaft turbine engine. The solid fuel is precharged in a primary combustion chamber of the engine.

SUMMARY OF THE INVENTION

The present invention provides a simple means to utilize a solid fuel in a turbine engine. The solid fuel billet is precharged into the primary combustion chamber of the engine. The fuel billet is of a size and shape required to achieve a desired duration and burning rate. While the fuel may contain an oxidizing agent to facilitate combustion, the main oxidizer is intended to be provided by air delivered into the combustion chamber by the engine compressor. The compressor may be an axial or centrifugal type compressor. Combustion of the solid fuel is initiated by electrically igniting a pyrotechnic chemical which, in turn, effects ignition of the solid fuel. Combustion of the solid fuel commences on the solid fuel boundary layer where the gas velocity is typically less than the flame propagation velocity. Combustion is completed in an after chamber where gas recirculation occurs, and the flame front is stabilized. Hot combustion gases from the after chamber are delivered to the turbine where they expand and provide power to drive the compressor. In turbofan and turbojet engines the hot gases are delivered to a jet nozzle where they expand to provide jet thrust. In the turboshaft engines, the hot gases are expanded within a turbine which drives the compressor and provides net shaft power.

BRIEF DESCRIPTION OF THE DRAWINGS

FIG. 1 is a sectional elevation of a solid fuel turbojet engine in accordance with the invention.

DETAILED DESCRIPTION OF THE PREFERRED EMBODIMENT OF THE INVENTION

As seen in FIG. 1, a turbojet engine 10 comprises a compressor 12 and a turbine 14 mounted at opposite ends of a common shaft 16. Air enters the compressor 12 through an inlet 18 where it is compressed and delivered into a combustion chamber 20. Baffles 22 and 23 are used at the entrance to the combustion chamber 20 to provide a compressed air boundary layer at the surface of a solid fuel charge 24 and to provide a low velocity zone where pyrolysis and initial combustion occurs.

An electrical igniter 26 is used to ignite a ring of conventional pyrotechnic chemical 28 which, in turn, ignites the solid fuel charge 24. While the preferred embodiment of this invention uses a solid fuel charge in the shape of a cylinder, it should be appreciated that other shapes can be used to provide the proper burning surface area as dictated by performance requirements.

A portion of the air leaving the compressor 12 may be passed through a conduit 30 to bypass the combustion chamber 20. The amount of air bypassed is controlled by a throttle valve 32 for the purpose of regulating the burning rate of the solid fuel and, therefore, the gas temperature entering the turbine 14.

Combustion gases which evolve at the surface of the fuel charge 24 enter an expansion chamber 34 where combustion continues and the flame front is stabilized. Gases exiting the expansion chamber 34 expand through the turbine 14 providing the power required to drive the compressor 12. The gases further expand through a jet nozzle 36 to provide jet thrust.

While the preferred embodiment of the invention has been disclosed, it should be appreciated that the invention is susceptible of modification without departing from the scope of the following claims.

I claim:

1. A solid fuel turbine engine comprising
   a centrally disposed axially extending rotatable compressor drive shaft,
   an annular combustion chamber having an inlet end and an outlet end and disposed about said compressor drive shaft intermediate the ends thereof,
   the annular configuration of said combustion chamber being defined by a pair of radially spaced, cylindrical walls which are concentric with one another and with said shaft,
   an annular solid fuel charge in said combustion chamber for producing combustion gases,
   an expansion chamber at the outlet end of said combustion chamber and axially aligned therewith,
   a compressor on said shaft at the inlet end of said combustion chamber for delivering air to said combustion chamber to provide the principal source of oxygen for combustion, and
   a turbine on the other end of said shaft at the outlet end of said combustion chamber driven by said combustion gases and driving aid compressor.

2. An engine in accordance with claim 1 including a compressed air bypass conduit communicating with the inlet end of said combustion chamber and with the expansion chamber in said combustion chamber for bypassing the solid fuel charge, and a valve in said conduit for controlling the flow of air therein.

3. An engine in accordance with claim 1 wherein said solid propellant is provided with a discrete pyrotechnic igniter adjacent an initial burn surface at a compressed air inlet end of said propellant.

* * * * *